US005673063A

United States Patent [19]

Weisbrod

[11] Patent Number: 5,673,063

[45] Date of Patent: Sep. 30, 1997

[54] DATA LINE DRIVER FOR APPLYING BRIGHTNESS SIGNALS TO A DISPLAY

[75] Inventor: Sherman Weisbrod, Skillman, N.J.

[73] Assignee: Thomson Consumer Electronics, S.A., Courbevoie, France

[21] Appl. No.: 399,011

[22] Filed: Mar. 6, 1995

[51] Int. Cl.[6] .................................................. G02F 1/133

[52] U.S. Cl. ........................ 345/100; 345/104; 345/204

[58] Field of Search ........................ 345/89, 100, 104, 345/147, 204, 58, 87, 90, 98, 99, 101, 158, 173; 348/790

[56] References Cited

U.S. PATENT DOCUMENTS

| | | | |
|---|---|---|---|
| 3,676,702 | 7/1972 | McGrogan, Jr. | 307/235 |
| 4,070,600 | 1/1978 | Butler et al. | 315/169 R |
| 4,429,305 | 1/1984 | Hosokawa et al. | 340/784 |
| 4,532,438 | 7/1985 | Reiner | 307/362 |
| 4,742,346 | 5/1988 | Gillette et al. | 340/793 |
| 4,766,430 | 8/1988 | Gillette et al. | 340/793 |
| 4,963,860 | 10/1990 | Stewart | 340/719 |
| 5,017,914 | 5/1991 | Uchida et al. | 340/784 |
| 5,113,134 | 5/1992 | Plus et al. | 324/158 |
| 5,170,155 | 12/1992 | Plus et al. | 340/784 |
| 5,222,082 | 6/1993 | Plus | 377/79 |

FOREIGN PATENT DOCUMENTS

| | | | |
|---|---|---|---|
| 95/31804 | 11/1995 | WIPO | G09G 3/26 |

OTHER PUBLICATIONS (RCA 87891) U.S. Ser. No. 08/399,012, filed Mar.–6–95 by S. Weisbrod, entitled Data Line Drivers with Column Initilization Transistor.

(RCA 87577) U.S. Ser. No. 08/399,009, filed Mar.–6–95 by R.I.A. Huq, et al., entitled Data Line Drivers with Common Reference Ramp Display.

(RCA 87876) U.S. Ser. No. 08/398,822, filed Mar.–6–95 by A.G.F. Dingwall, et al., entitled An Amplifier with Pixel Voltage Compensation For A Display.

*Primary Examiner*—John K. Peng

*Assistant Examiner*—Peter Kovacs

*Attorney, Agent, or Firm*—Joseph S. Tripoli; Joseph J. Laks; Sammy S. Henig

[57] ABSTRACT

A video display driver applies a video signal to pixels arranged in columns and rows of a liquid crystal display. A given column or data line driver includes a field effect transistor that operates as a comparator. The comparator is responsive to the video signal and to a reference ramp signal. A triggering voltage of the comparator is automatically and periodically adjusted. A drain voltage of the transistor that is equal to a threshold voltage of the transistor is developed in a stray capacitance, during the automatic adjustment period. A pulse signal, is coupled via the capacitance to increase the drain voltage. The drain voltage is applied to a gate electrode of a second field effect transistor that applies a data ramp voltage to the pixels. The pulse signal provides a small amount of drive in the second transistor.

14 Claims, 3 Drawing Sheets

DATA LINE DRIVER FOR APPLYING BRIGHTNESS SIGNALS TO A DISPLAY

This invention relates generally to drive circuits for display devices and particularly to a system for applying brightness signals to pixels of a display device, such as a liquid crystal display (LCD).

Display devices, such as liquid crystal displays, are composed of a matrix or an array of pixels arranged horizontally in rows and vertically in columns. The video information to be displayed is applied as brightness (gray scale) signals to data lines which are individually associated with each column of pixels. The row of pixels are sequentially scanned and the capacitances of the pixels within the activated row are charged to the various brightness levels in accordance with the levels of the brightness signals applied to the individual columns.

In an active matrix display each pixel element includes a switching device which applies the video signal to the pixel, Typically, the switching device is a thin film transistor (TFT), which receives the brightness information from solid state circuitry. Because both the TFT's and the circuitry are composed of solid state devices it is preferable to simultaneously fabricate the TFT's and the drive circuitry utilizing either amorphous silicon or polysilicon technology.

Liquid crystal displays are composed of a liquid crystal material which is sandwiched between two substrates. At least one, and typically both of the substrates, is transparent to light and the surfaces of the substrates which are adjacent to the liquid crystal material support patterns of transparent conductive electrodes arranged in a pattern to form the individual pixel elements. It may be desirable to fabricate the drive circuitry on the substrates and around the perimeter of the display together with the TFT's.

Amorphous silicon has been the preferable technology for fabricating liquid crystal displays because this material can be fabricated at low temperatures. Low fabrication temperature is important because it permits the use of standard, readily available and inexpensive substrate materials. However, the use of amorphous silicon thin film transistors (a-Si TFTs) in integrated peripheral pixel drivers has been limited because of, low mobility, threshold voltage drift and the availability of only N-MOS enhancement transistors.

U.S. Pat. No. 5,170,155 in the names of Plus et al., entitled "System for Applying Brightness Signals To A Display Device And Comparator Therefore", describes a data line or column driver of an LCD. The data line driver of Plus et al., operates as a chopped ramp amplifier and utilizes TFTs. In the data line driver of Plus et al., an analog signal containing picture information is sampled and stored in an input sampling capacitor of the driver. A reference ramp produced in a reference ramp generator is applied to the input capacitor of the driver via a TFT switch.

In the Plus et al., arrangement, a transistor switch of a given data line driver couples a data ramp voltage to a data line of the matrix for developing a ramp voltage in pixels of the selected row. The transistor switch is controlled by a comparator. The transistor switch is turned on for coupling the data ramp voltage to the data line and is turned off at a controllable instant that is determined by the picture information containing signal.

It may be desirable to form the transistor switch from a TFT and to maintain the TFT switch conductive without significant gate over-drive. This is so because excessive gate over-drive may cause an increased threshold voltage drift in the TFT.

A data line driver, embodying an aspect of the invention, develops a signal containing picture information in pixels arranged in a given column of a display device. The data line driver includes a source of a data ramp signal. A first transistor is coupled to the source of data ramp signal for applying the data ramp signal to a data line associated with the column. A second transistor generates a first portion of a control voltage of the first transistor that varies in accordance with a variation of a threshold voltage of one of the first and second transistors. A first capacitance couples a pulse voltage to the control terminal to generate a second portion of the control voltage. The control voltage conditions the first transistor for operation in a first switching state. A source of a video signal and a source of a reference ramp signal are coupled to an input of the second transistor for disabling the first switching state when a signal that is developed at the second transistor input from the video and reference ramp signals exceeds a threshold voltage of the second transistor.

Figure 1:
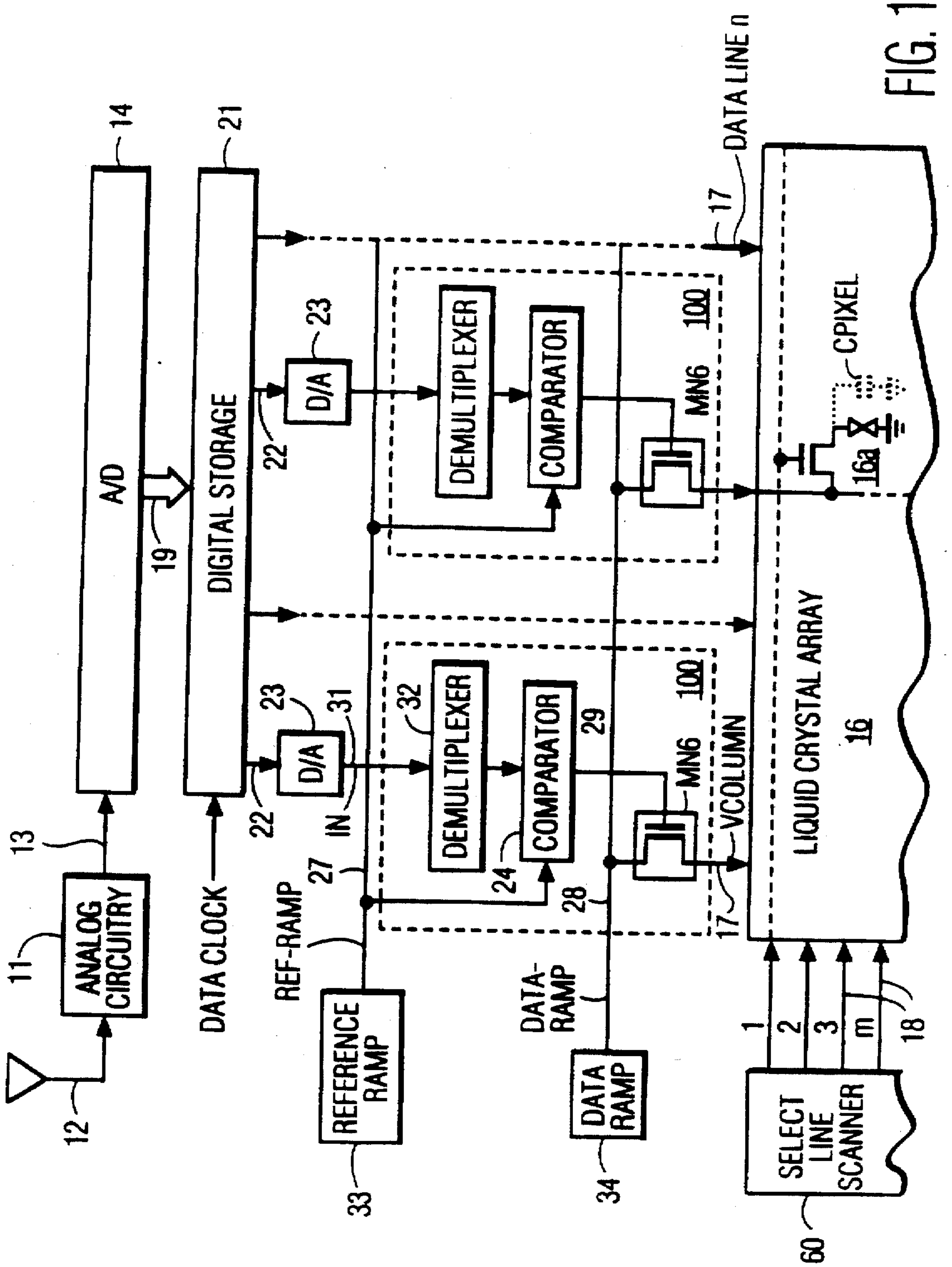
FIG. 1 illustrates a block diagram of a liquid crystal display arrangement that includes demultiplexer and data line drivers, embodying an aspect of the invention.

In FIG. 1, that includes multiplexer and data line drivers 100, embodying an aspect of the invention, an analog circuitry 11 receives a video signal representative of picture information to be displayed from, for example, an antenna 12. The analog circuitry 11 provides a video signal on a line 13 as an input signal to an analog-to-digital converter (A/D) 14.

The television signal from the analog circuitry 11 is to be displayed on a liquid crystal array 16 which is composed of a large number of pixel elements, such as a liquid crystal cell **16*a*, arranged horizontally in m=560 rows and vertically in n=960 columns. Liquid crystal array 16 includes n=960 columns of data lines 17, one for each of the vertical columns of liquid crystal cells 16*a*, and m=560 select lines 18, one for each of the horizontal rows of liquid crystal cells 16*a***.

A/D converter 14 includes an output bus bar 19 to provide brightness levels, or gray scale codes, to a memory 21 having 40 groups of output lines 22. Each group of output lines 22 of memory 21 applies the stored digital information to a corresponding digital-to-analog (D/A) converter 23. There are 40 D/A converters 23 that correspond to the 40 groups of lines 22, respectively. An output signal IN of a given D/A converter 23 is coupled via a corresponding line 31 to corresponding multiplexer and data line driver 100 that drives corresponding data line 17. A select line scanner 60 produces row select signals in lines 18 for selecting, in a conventional manner, a given row of array 16. The voltages developed in 960 data lines 17 are applied during a 32 microsecond line time, to pixels **16*a*** of the selected row.

A given demultiplexer and data line driver 100 uses chopped ramp amplifiers, not shown in detail in FIG. 1, with a low input capacitance that is, for example, smaller than 1 pf to store corresponding signal IN and to transfer stored input signal IN to corresponding data line 17. Each data line 17 is applied to 560 rows of pixel cells **16*a*** that form a capacitance load of, for example, 20 pf.

Figure 2:
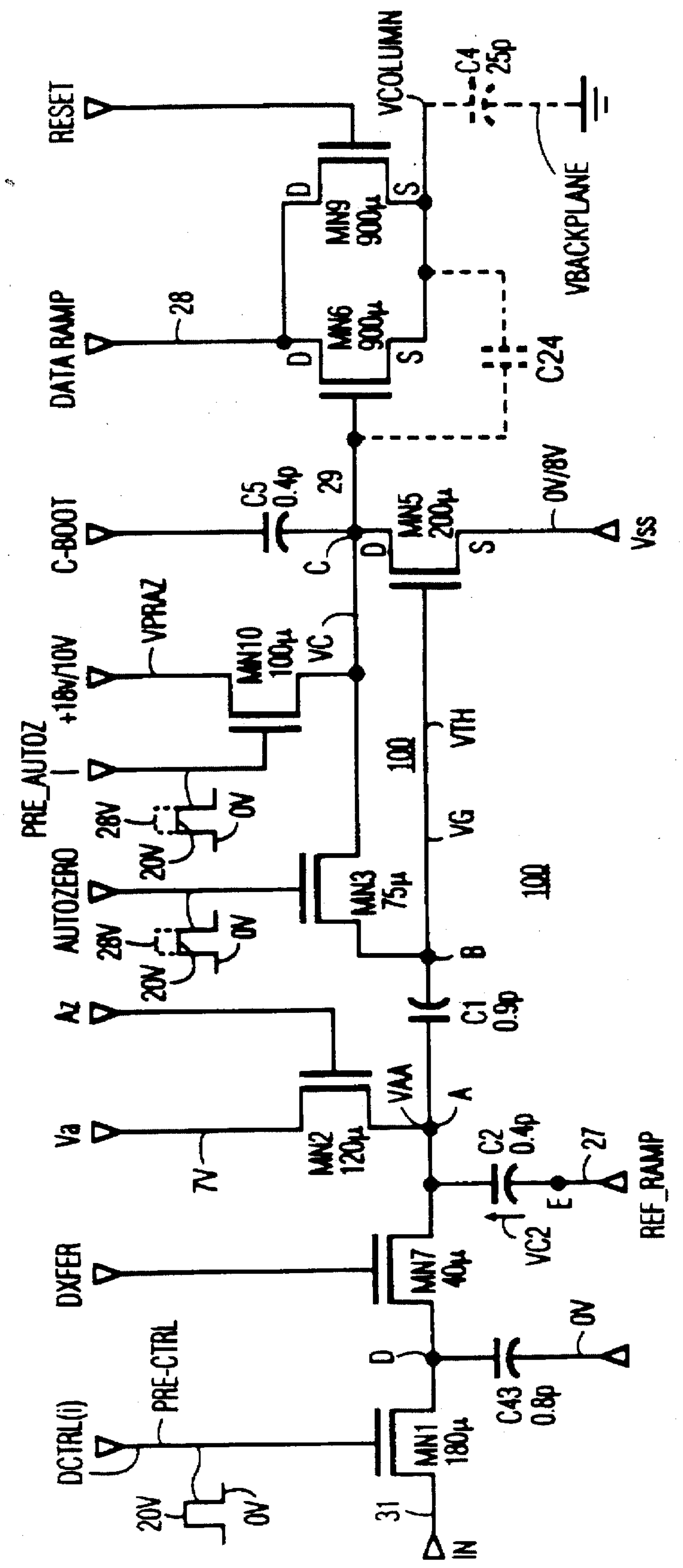
FIG. 2 illustrates the demultiplexer and data line driver of FIG. 1 in more detail.

FIG. 2 illustrates in detail a given one of demultiplexer and data line drivers 100. FIGS. **3*a*–3*h* illustrate waveforms useful for explaining the operation of the circuit of FIG. 2. Similar symbols and numerals in FIGS. 1, 2 and 3*a*–3*h*** indicate similar items or functions. All the transistors of demultiplexer and line driver 100 of FIG. 2 are TFT's of the N-MOS type. Therefore, advantageously, they can be formed together with array 16 of FIG. 1 as one integrated circuit.

Figures 3A, 3B, 3C, 3D, 3E, 3F, 3G, 3H:
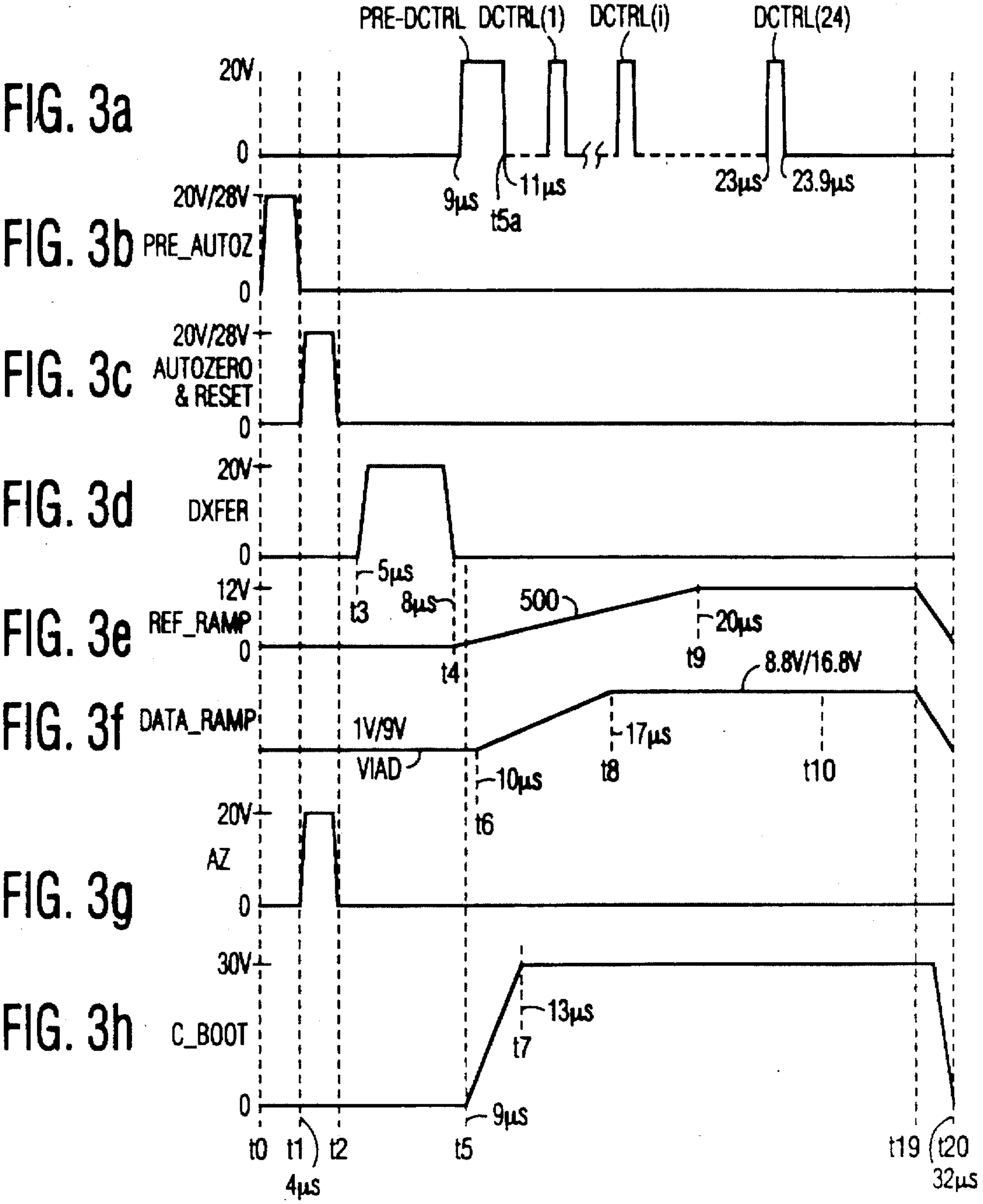
FIGS. 3*a*–3*h* illustrate waveforms useful for explaining the operation of the circuit of FIG. 2.

Prior to sampling the video signal in signal line 31 of FIG. 2, a voltage developed at a terminal D of a capacitor C43 is initialized. To initialize the voltage in capacitor C43, D/A converter 23 develops a predetermined voltage in line 31 such as the maximum, or full scale voltage of video signal IN. A transistor MN1 applies the initializing voltage in line 31 to capacitor C43 when a control pulse PRE-DCTRL of FIG. 3*a* is developed at the gate of transistor MN1. In this way, the voltage in capacitor C43 is the same prior to each pixel updating cycle. Following pulse PRE-DCTRL, signal IN changes to contain video information that is used for the current pixel updating cycle.

Demultiplexer transistor MN1 of a demultiplexer 32 of FIG. 2 samples analog signal IN developed in signal line 31 that contains video information. The sampled signal is stored in sampling capacitor C43 of demultiplexer 32. The sampling of a group of 40 signals IN of FIG. 1 developed in lines 31 occurs simultaneously under the control of a corresponding pulse signal DCTRL(i). As shown in FIG. 3*a*, 24 pulse signals DCTRL(i) occur successively, during an interval following t5*a*–t20. Each pulse signal DCTRL(i) of FIG. 2 controls the demultiplexing operation in a corresponding group of 40 demultiplexers 32. The entire demultiplexing operation of 960 pixels occurs in interval t5*a*–t20 of FIG. 3*a*.

To provide an efficient time utilization, a two-stage pipeline cycle is used. Signals IN are demultiplexed and stored in 960 capacitors C43 of FIG. 2 during interval t5*a*–t20, as explained before. During an interval t3–t4 of FIG. 3*d*, prior to the occurrence of any of pulse PRE-DCTRL and the 24 pulse signals DCTRL of FIG. 3*a*, each capacitors C43 of FIG. 2 is coupled to a capacitor C2 via a transistor MN7 when a pulse signal DXFER of FIG. 3*d* occurs. Thus, a portion of signal IN that is stored in capacitor C43 is transferred to capacitor C2 of FIG. 2 and develops a voltage VC2. During interval t5*a*–t20, when pulse signals DCTRL of FIG. 3*a* occur, voltage VC2 of FIG. 2 in capacitor C2 is applied to array 16 via corresponding data line 17, as explained below. Thus, signals IN are applied to array 16 via the two-stage pipeline.

A reference ramp generator 33 provides a reference ramp signal REF-RAMP on an output conductor 27. Conductor 27 is coupled, for example, in common to a terminal E of each capacitor C2 of FIG. 2 of each demultiplexer and data line driver 100. A terminal A of capacitor C2 forms an input terminal of a comparator 24. A data ramp generator 34 of FIG. 1 provides a data ramp voltage DATA-RAMP via an output line 28. In demultiplexer and data line driver 100 of FIG. 2, a transistor MN6 applies voltage DATA-RAMP to data line 17 to develop a voltage VCOLUMN. The row to which voltage VCOLUMN is applied is determined in accordance with row select signals developed in row select lines 18. A display device using a shift register for generating select signals such as developed in lines 18 is described in, for example, U.S. Pat. Nos. 4,766,430 and 4,742,346. Transistor MN6 is a TFT having a gate electrode that is coupled to an output terminal C of comparator 24 by a conductor 29. An output voltage VC from the comparator 24 controls the conduction interval of transistor MN6.

In each pixel updating period, prior to applying voltage VC of comparator 24 to transistor MN6 to control the conduction interval of transistor MN6, comparator 24 is automatically calibrated or adjusted. At time t0 (FIG. 3*b*) transistor MN10 is conditioned to conduct by a signal PRE-AUTOZ causing imposition of a voltage VPRAZ onto the drain electrode of a transistor MN5 and the gate electrode of transistor MN6. This voltage, designated VC, stored on stray capacitances such as, for example, a source-gate capacitance C24, shown in broken lines, of transistor MN6 causes transistor MN6 to conduct. Transistor MN5 is nonconductive when transistor MN10 pre-charges capacitance C24.

At a time t1 of FIG. 3*b*, pulse signal PRE-AUTOZ terminates and transistor MN10 is turned off. At time t1, a pulse signal AUTOZERO is applied to a gate electrode of a transistor MN3 that is coupled between the gate and drain terminals of transistor MN5 to turn on, transistor MN3. Simultaneously, a pulse signal AZ of FIG. 3*g* is applied to a gate electrode of a transistor MN2 to turn on transistor MN2. When transistor MN2 is turned on, a voltage Va is coupled through transistor MN2 to terminal A of a coupling capacitor C1. Transistor MN2 develops a voltage VAA at terminal A at a level of voltage Va for establishing a triggering level of comparator 24 at terminal A. The triggering level of comparator 24 is equal to voltage Va. A second terminal B of capacitor C1 is coupled to transistor MN3 and the gate of transistor MN5.

Conductive transistor MN3 equilabrates the charge at terminal C, between the gate and drain electrodes of transistor MN5, and develops a gate voltage VG on the gate electrode of transistor MN5 at terminal B. Initially, voltage VG exceeds a threshold level VTH of transistor MN5 and causes transistor MN5 to conduct. The conduction of transistor MN5 causes the voltages at each of terminals B and C to decrease until each becomes equal to the threshold level VTH of transistor MN5, during the pulse of signal AUTOZERO. Gate electrode voltage VG of transistor MN5 at terminal B is at its threshold level VTH when voltage VAA at terminal A is equal to voltage Va. At time t2 of FIGS. 3*c* and 3*f*, transistors MN3 and MN2 of FIG. 2 are turned off and comparator 24 is calibrated or adjusted. Therefore, the triggering level of comparator 24 of FIG. 2 with respect to input terminal A is equal to voltage Va.

As explained above, pulse signal DXFER developed, beginning at time t3, at the gate of transistor MN7 couples capacitor C43 of demultiplexer 32 to capacitor C2 via terminal A. Consequently, voltage VC2 that is developed in capacitor C2 is proportional to the level of sampled signal IN in capacitor C43. The magnitude of signal IN is such that voltage VAA developed at terminal A, during pulse signal DXFER, is smaller than triggering level Va of comparator 24. Therefore, comparator transistor MN5 remains nonconductive immediately after time t3. A voltage difference between voltage VAA and the triggering level of comparator 24 that is equal to voltage Va is determined by the magnitude of signal IN.

When voltage VAA at terminal A exceeds voltage Va, transistor MN5 becomes conductive. On the other hand, when voltage VAA at terminal A does not exceed voltage Va, transistor MN5 is nonconductive. The automatic calibration or adjustment of comparator 24 compensates for threshold voltage drift, for example, in transistor MN5.

A pulse RESET of FIG. 2 has a waveform and timing similar to that of pulse signal AUTOZERO of FIG. 3*c*. Pulse voltage RESET is coupled to the gate electrode of a transistor MN9, that is coupled in parallel with transistor MN6, to turn on transistor MN9. When transistor MN9 is conductive, it establishes a predetermined initial condition of voltage VCOLUMN on line 17 and in pixel cell 16*a* of FIG. 1 of the selected row. Advantageously, establishing the initial condition in pixel cell 16*a* prevents previous stored picture information contained in the capacitance of pixel cell 16*a* from affecting pixel voltage VCOLUMN at the current update period of FIGS. 3*b*–3*g*.

Transistor MN9 establishes voltage VCOLUMN at an inactive level VIAD of signal DATA-RAMP, prior to time t6. A capacitance C4 associated with the data line 17 has been partially charged/discharged toward inactive level VIAD of signal DATA-RAMP, during interval t0–t1, immediately after transistor MN10 has been turned on. During pulse signal AUTOZERO, gate voltage VC of transistor MN6 is reduced to the threshold voltage of transistor MN5. Therefore, transistor MN6 is substantially turned off. The charge/discharge of capacitance C4 is performed predominantly during interval t1–t2, when transistor MN9 is turned on. Advantageously, utilizing transistor MN9, and transistor MN6, for establishing the initial conditions of voltage VCOLUMN, reduces a threshold voltage drift of transistor MN6. The threshold voltage drift of transistor MN6 is reduced because transistor MN6 is driven for a shorter period than if it had to establish, alone, the initial condition of voltage VCOLUMN.

Transistor MN6 is designed to have similar parameters and stress and, therefore, a similar threshold voltage drift as transistor MN5. Therefore, advantageously, the threshold voltage drift of transistor MN6 tracks the threshold voltage drift of transistor MN5.

In one of two modes of operations that are discussed below, source voltage Vss of transistor MN5 is equal to 0V. Also voltage VCOLUMN, during interval t2–t4, that is equal to inactive level VIAD of signal DATA-RAMP, is equal to 1V. Drain voltage VC of transistor MN5 at terminal C, prior to time t5, is equal to threshold voltage VTH of transistor MN5. Because of the aforementioned tracking, variation of threshold voltage VTH of transistor MN5 maintains the gate-source voltage or transistor MN6 at a level that is 1V less than the threshold voltage of transistor MN6. The IV difference occurs because there is a potential difference of one volt between the source electrodes of transistors MN5 and MN6.

In accordance with an aspect of the invention, a pulse voltage C-BOOT of FIG. 3*h* is capacitively coupled via a capacitor C5 of FIG. 2 to terminal C, at the gate of transistor MN6. Capacitor C5 and capacitance C24 form a voltage divider. The magnitude of voltage C-BOOT is selected so that gate voltage VC increases with respect to the level developed, during pulse AUTOZERO, by a predetermined small amount sufficient to maintain transistor MN6 conductive. As explained before, transistor MN5 is nonconductive following time 13 of FIG. 3*d*. Thus, the predetermined increase in voltage VC that is in the order of 5V is determined by the capacitance voltage divider that is formed with respect to voltage BOOT-C at terminal C. The increase in voltage VC is independent on threshold voltage VTH. Therefore, threshold voltage drift of transistor MN5 or MN6 over the operational life, does not affect the increase by voltage C-BOOT. It follows that, over the operational life when voltage VTH may significantly increase, transistor MN6 is maintained conductive with small drive prior to time t6 of FIG. 3*f*.

Any threshold voltage drift of voltage VTH of transistor MN5 will cause the same change in voltage VC at terminal C. Assume that the threshold voltage of transistor MN6 tracks that of transistor MN5. Therefore, voltage C-BOOT need not compensate for threshold voltage drift of transistor MN6. It follows that transistor MN6 will be turned on by voltage C-BOOT irrespective of any threshold voltage drift of transistor MN5 and MN6. Thus, the threshold voltage variation of transistor MN5 compensates that of transistor MN6.

The capacitance coupling of voltage C-BOOT enables using gate voltage VC of transistor MN6 at terminal C at a level that is only slightly greater than the threshold voltage of transistor MN6 such as by 5V over the threshold voltage of transistor MN6. Therefore, transistor MN6 is not significantly stressed. By avoiding significant drive voltages to the gate electrode of transistor MN6, advantageously, threshold voltage drift in transistor MN6 that may occur over its operational life is substantially smaller than if transistor MN6 were driven with a large drive voltage.

In accordance with another inventive feature, voltage C-BOOT is developed in a ramping manner during interval t5–t7 of FIG. 3*h*. The relatively slow rise time of voltage C-BOOT helps reduce the stress on transistor MN6. Having the gate voltage of transistor MN6 increase slowly allows the source of transistor MN6 to charge such that the gate-source potential difference remains smaller for larger periods. Interval t5–t7 has a length of 4 μsec. By maintaining the length of interval t5–t7 longer than 2 μsec, or approximately 20% of the length of interval t6–t8 of signal DATA-RAMP of FIG. 2*f*, the voltage difference between the gate and the source voltage in transistor MN6 is, advantageously, reduced for a significantly large period. Therefore, stress is reduced in TFT MN6.

At time t4 of FIG. 3*e*, reference ramp signal REF-RAMP begins up-ramping. Signal REF-RAMP is coupled to terminal E of capacitor C2 of FIG. 2 that is remote from input terminal A of comparator 24. As a result, voltage VAA at input terminal A of comparator 24 is equal to a sum voltage of ramping signal REF-RAMP and voltage VC2 developed in capacitor C2.

Following time t6, data ramp voltage DATA-RAMP coupled to the drain electrode of transistor MN6 begins upramping. With feedback coupling to terminal C from the stray gate-source and gate-drain capacitance of transistor MN6, the voltage at terminal C will be sufficient to condition transistor MN6 to conduct for all values of the data ramp signal DATA-RAMP. Following time t4, and as long as ramping voltage VAA at terminal A has not reached the triggering level that is equal to voltage Va of comparator 24, transistor MN5 remains non-conductive and transistor MN6 remains conductive. As long as transistor MN6 is conductive, upramping voltage DATA-RAMP is coupled through transistor MN6 to column data line 17 for increasing the potential VCOLUMN of data line 17 and, therefore, the potential applied to pixel capacitance CPIXEL of the selected row. The capacitive feedback of ramp voltage VCOLUMN via, for example, capacitance 24, sustains transistor MN6 in conduction, as long as transistor MN5 exhibits a high impedance at terminal C, as indicated before.

During an upramping portion 500 of signal REF-RAMP of FIG. 3*e*, sum voltage VAA at terminal A exceeds triggering level Va of comparator 24, transistor MN5 becomes conductive. The instant, during portion 500, when transistor MN5 becomes conductive varies as a function of the magnitude of signal IN.

When transistor MN5-becomes conductive, gate voltage VC of transistor MN6 decreases and causes transistor MN6 to turn off. As a result, the last value of voltage DATA-RAMP that occurs prior to the turn-off of transistor MN6 is held unchanged or stored in pixel capacitance CPIXEL until the next updating cycle. In this way, the current updating cycle is completed.

In order to prevent polarization of liquid crystal array 16 of FIG. 1, a so-called backplane or common plane of the array, not shown, is maintained at a constant voltage VBACKPLANE. Multiplexer and data line driver 100 produces, in one updating cycle, voltage VCOLUMN that is at one polarity with respect to voltage VBACKPLANE and at the opposite polarity and the same magnitude, in an alternate updating cycle. To attain the alternate polarities, voltage DATA-RAMP is generated in the range of 1V–8.8V in one updating cycle and in the range of 9V–16.8V in the alternate update cycle. Whereas, voltage VBACKPLANE is established at an intermediate level between the two ranges. Because of the need to generate voltage DATA-RAMP in two different voltage ranges, signals or voltages AUTOZERO, PRE-AUTOZ, Vss and RESET have two different peak levels that change in alternate updating cycles in accordance with the established range of voltage DATA-RAMP.

What is claimed is:

1. A data line driver for developing a signal containing picture information in pixels arranged in a given column of a display device, comprising:

a source of a data ramp signal, a first transistor coupled to said source of data ramp signal for applying said data ramp signal to a data line associated with said column;

a second transistor for generating a first portion of a control voltage of said first transistor that varies in accordance with a variation of a threshold voltage of one of said first and second transistors;

a source of a pulse voltage;

a first capacitance for coupling said pulse voltage to a second capacitance that is formed with respect to a control terminal of said first transistor to generate a second portion of said control voltage such that said first and second capacitances form a voltage divider with respect to said pulse voltage, said control voltage conditioning said first transistor for operation in a first switching state; and a source of a video signal and a source of a reference ramp signal coupled to an input of said second transistor for disabling said first switching state when a signal that is developed at said second transistor input from said video and reference ramp signals exceeds a threshold voltage of said second transistor.

2. A data line driver according to claim 1 wherein a high impedance is developed in said control terminal of said first transistor that enables said first transistor to operate in said first switching state.

3. A line driver according to claim 1 wherein, in said first switching state, said first transistor is conductive and when said threshold voltage of said second transistor is exceeded said first transistor is rendered nonconductive.

4. A line driver according to claim 1 further comprising, a third transistor for coupling a main current conducting terminal of said second transistor to a control terminal of said second transistor for generating said first portion of said control voltage in accordance with said threshold voltage of said second transistor.

5. A data line driver for developing a signal containing picture information in pixels arranged in a given column of a display device, comprising:

a source of a data ramp signal;

a first transistor coupled to said source of data ramp signal for applying said data ramp signal to a data line associated with said column;

a first switching arrangement for precharging a capacitance that is formed with respect to a control terminal of said first transistor;

a second transistor for generating a first portion of a control voltage of said first transistor that varies in accordance with a variation of a threshold voltage of one of said first and second transistors;

a third transistor for varying a charge in said precharged capacitance until a control voltage of said second transistor becomes equal to said threshold voltage of said second transistor;

a source of a pulse voltage;

a first capacitance for coupling said pulse voltage to said control terminal to generate a second portion of said control voltage, said control voltage conditioning said first transistor for operation in a first switching state; and a source of a video signal and a source of a reference ramp signal coupled to an input of said second transistor for disabling said first switching state when a signal that is developed at said second transistor input from said video and reference ramp signals exceeds a threshold voltage of said second transistor.

6. A data line driver according to claim 1 wherein said control terminal of said first transistor is coupled at a junction terminal between said first and second capacitances.

7. A data line driver according to claim 1 wherein said control voltage conditions said first transistor for operation in said first switching state at a level that is determined in accordance with a variation in said threshold voltage of said second transistor.

8. A data line driver according to claim 1 wherein said second transistor forms a gain stage in a comparator.

9. A data line driver for developing a signal containing picture information in pixels arranged in a given column of a display device, comprising:

a source of a data ramp signal;

a first transistor coupled to said source of data ramp signal for applying said data ramp signal to a data line associated with said column;

a second transistor coupled to a control terminal of said first transistor for generating a first portion of a control voltage at said control terminal of said first transistor at a magnitude established by of a threshold voltage of said second transistor;

a first capacitance;

a source of a pulse voltage capacitively coupled to a second capacitance that is formed with respect to said control terminal of said first transistor via said first capacitance such that said first and second capacitances form a voltage divider with respect to said pulse voltage for generating a second portion of said control voltage, said first and second portions of said control voltage being combined to condition said first transistor for operation in a first conduction state;

a source of video signal coupled to a control terminal of said second transistor; and a source of reference ramp signal coupled to said control terminal of said second transistor for applying a signal that is developed at said control terminal of said second transistor to said control terminal of said first transistor in a manner to change said first conduction state to a second conduction state in accordance with a difference between said signal that is developed at said control terminal of said second transistor and said threshold voltage of said second transistor.

10. A data line driver according to claim 9 further comprising, a first switching arrangement coupled to said control terminal of said second transistor and to a main current conducting terminals of said second transistor for developing said first portion of said control voltage of said first transistor.

11. A data line driver according to claim 9 wherein a change in said threshold voltage of said second transistor produces a corresponding change in said first portion of said control voltage of said first transistor in a manner to compensate for a change in a threshold voltage of said first transistor.

12. A data line driver according to claim 9 wherein said second transistor is included in a comparator having a triggering level that is automatically adjusted to compensate for a change in said threshold voltage of said second transistor and wherein said first portion of said control voltage of said first transistor is generated when said triggering level is adjusted.

13. A data line driver for developing a signal containing picture information in pixels arranged in a given column of a display device, comprising:

a source of a data ramp signal;

a first transistor coupled to said source of data ramp signal for applying said data ramp signal to a data line associated with said column;

a comparator coupled to said first transistor;

a source of a second ramp signal capacitively coupled to a control terminal of said first transistor for generating a control voltage of said first transistor to condition said first transistor for operation in a first switching state such that said second ramp signal is coupled to said first transistor in a manner that bypasses said comparator; and a source of a video signal and a source of a reference ramp signal coupled to an input of said comparator for disabling said first switching state when a signal that is developed at said comparator input from said video and reference ramp signals exceeds a triggering level of said comparator.

14. A data line driver according to claim 13 further comprising, a second transistor for generating a portion of said control voltage to condition said first transistor for operation in said first switching state in accordance with a threshold voltage of said second transistor.

* * * * *